United States Patent [19]
Pragnell et al.

[11] 3,923,171
[45] Dec. 2, 1975

[54] TENSION LINES

[75] Inventors: John James Muir Pragnell, Farnham; Robert Leonard Langley, Baldock, both of England

[73] Assignee: Irvin Industries Inc., Greenwich, Conn.

[22] Filed: Nov. 7, 1974

[21] Appl. No.: 521,916

[30] Foreign Application Priority Data
Nov. 8, 1973 United Kingdom............... 51946/73

[52] U.S. Cl.............................................. 254/135 R
[51] Int. Cl.²............................................. B66D 3/00
[58] Field of Search.... 254/135 R, 161, 167, 190 R; 280/480; 272/82, 83 R; 267/69, 74, 73

[56] References Cited
UNITED STATES PATENTS

| | | | |
|---|---|---|---|
| 1,699,268 | 1/1929 | Atwood | 280/480 |
| 2,878,013 | 3/1959 | Piodi | 280/480 |
| 3,529,820 | 9/1970 | Templeton | 272/82 |

*Primary Examiner*—Robert R. Song
*Attorney, Agent, or Firm*—Browne, Beveridge, DeGrandi & Kline

[57] ABSTRACT

In order to dampen recoil when the load on a tension line is suddenly released, the line is associated with an elongate coextensive flexible member, for example a plastics sleeve, which bears substantially no load but is of such material and mass to provide substantial damping.

9 Claims, 4 Drawing Figures

TENSION LINES

This invention relates to tension lines such as strops, ropes, suspension lines, slings and the like of synthetic textile material for supporting heavy loads e.g. loads of the order of several tons weight. Such tension lines are termed herein "tension lines of the kind described".

In many applications tension lines of the kind described are preferred to other high load tension lines such as steel cable or heavy jute ropes because of their lightness and considerable ease of handling. Synthetic textile tension lines do have however a relatively large amount of elasticity as compared with jute rope or steel cable, and this can give rise to serious difficulties in some situations. Thus should the load be suddenly removed for example by failure of the line or of a linkage device, the line will recoil violently and possibly dangerously. For example people near the line could be struck, or, in another particular situation, namely that of a helicopter lifting a heavy load there is a risk that the line in recoiling will become entangled in the rotor blades and cause the helicopter to crash.

With a view to overcoming such problems we propose a tension line of the kind described having associated in close parallel relationship therewith an elongate flexible member co-extensive therewith over at least a substantial length of the tension line, the member and line being capable of relative longitudinal displacement so that the member does not bear any considerable part of a load supported by the tension line, said member however being of such material and mass as, should the load be suddenly released, substantially to dampen the recoil motion of the tension line.

The damping member may extend over substantially all the length of the tension line to provide the maximum damping effect, although in some applications sufficient damping may be provided by a member extending over between one-half and three-quarters of the length of the tension line. The damping member may be one continuous length or a series of shorter lengths if desired.

While the damping member is provided to dampen recoil motion, it is nevertheless preferably sufficiently flexible to allow the tension line to be coiled easily and compactly. This is particularly important where tension lines of considerable length e.g. between eight and eighty feet are concerned such as are employed in connection with the transportation of loads by helicopter. Various forms of the damping member may be envisaged, for example a strip of textile material or plastics loosely stitched, tied, clipped or otherwise secured at intervals to the tension line. We propose however a particularly convenient and simple form of damping member, which is a sleeve surrounding the tension line, and preferably forming a reasonably close sliding fit around the tension line so that it is not necessary to provide separate securing means. The sleeve may be of any suitable material but it has been found that a thermoplastic such as soft PVC is a convenient material. The sleeve may be preformed and the tension line be threaded through the sleeve. The thermoplastic sleeve may then be heated and formed to the cross-sectional shape of the tension member. Alternatively the thermoplastic sleeve may be extruded around the tension line.

Where the sleeve is of a soft thermoplastics, its cross-sectional area may be approximately the same as that of the tension line for maximum recoil damping; in practice however, a sleeve cross-sectional area about one-fifth of that of the tension line has proved satisfactory in substantially damping recoil motion.

If desired, a plurality of tension line e.g. four in parallel may be ensleeved within a single damping sleeve.

In order that the invention may be readily understood certain embodiments thereof will now be described by way of example with reference to the accompanying drawings in which.

Figure 1:
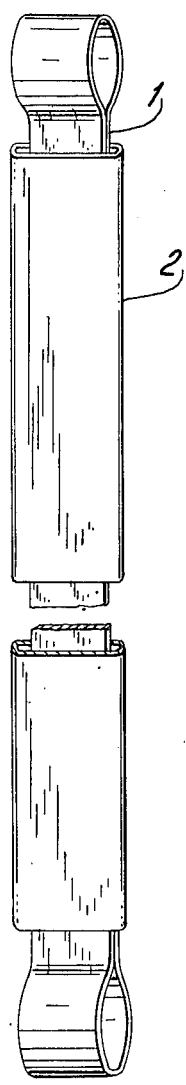
FIG. 1 is a view of a tension line according to the invention.

Referring to FIG. 1 there is shown a tension line in the form of terylene webbing 1 some 6 feet long having a nominal breaking strain of 6,000 lbf. The line measuring roughly two inches wide and 0.125 inches thick is ensleeved in a soft polyvinyl chloride damping sleeve 2 having a wall thickness of 0.020 inches. The sleeve extends over substantially the whole length of the tension line and is a sufficiently close fit thereover to maintain its position without any additional securing means.

Figure 2:
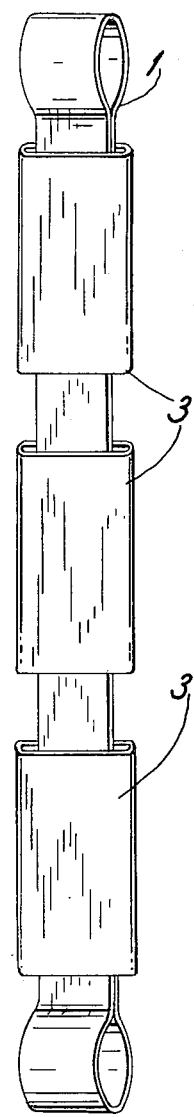
FIG. 2 is a similar view of a further embodiment of tension line.

In FIG. 2 a shorter tension line is shown, having a damper sleeve associated therewith but which is in the form of a series of lengths 3 of polyvinyl chloride similar to that shown in FIG. 1.

Figure 3:
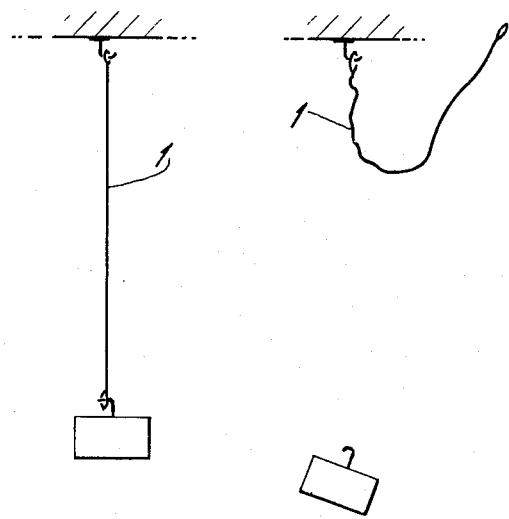
FIG. 3 shows diagrammatically the recoil of a prior art tension line.
Figure 4:
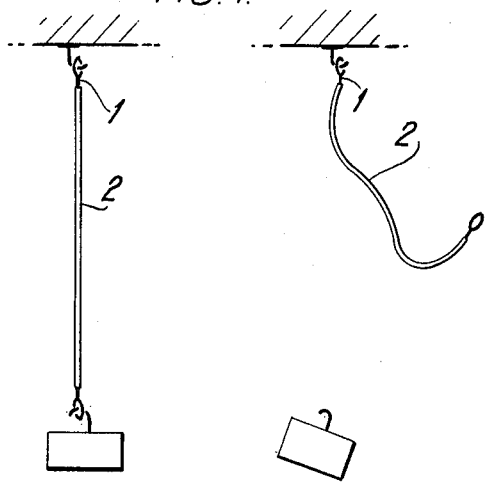
FIG. 4 shows diagrammatically the recoil of a tension line according to the invention.

In FIG. 3 there is shown a typical recoil of a tension line of the webbing mentioned above but without a damping sleeve. The webbing is loaded to about a tenth of its breaking strain and the load suddenly released. The amount of recoil is considerable, and may involve risk as mentioned earlier. Reference to FIG. 4 however shows that the recoil is considerably reduced in the case of the FIG. 1 embodiment of the invention.

The greater the load put on the tension line the greater the amount of damping is required to sufficiently curtail the recoil. For a terylene tension line as described a polyvinyl chloride sleeve of roughly the same cross sectional area as the line is required to provide satisfactory damping of recoil from a load of one fifth of the breaking strain. For greater loads a more substantial sleeve is required and indeed for high loads, e.g. one half of the breaking strain, the sleeve required would be so substantial that handling and coiling of the tension line would be difficult. The invention will therefore preferably be used in applications where the tension line is to be loaded up to a tenth or a fifth of its breaking strain.

What we claim is:

1. In a tension line system including a load supporting tension line having a high modulus of elasticity with substantial recoil rebound on dynamic unloading of a load within the elastic limit thereof, the combination with said tension line of an elongate flexible member for damping recoil rebound of said tension line on dynamic unloading thereof, said flexible member being co-extensive in close parallel relationship over at least a substantial length of said tension line, said tension line and said flexible member being capable of relative longitudinal displacement whereby said flexible member is substantially non-load bearing with respect to the load supported by said tension line, and the mass and material of said flexible member being predetermined in relation to the ratio of expected normal loading of said tension line to the load limit breaking point thereof.

2. A tension line system according to claim 1 in which said flexible member comprises a sleeve surrounding said tension line.

3. A tension line system according to claim 2 in which said sleeve is a sufficiently close fit around said tension line to maintain itself in position.

4. A tension line system according to claim 2 in which said sleeve extends over substantially the whole length of said tension line.

5. A tension line system according to claim 2 in which said sleeve extends over a fraction, greater than substantially one half, of said tension line.

6. A tension line system according to claim 1 in which said flexible member is one continuous length.

7. A tension line system according to claim 1 in which said flexible member comprises a series of lengths.

8. A tension line system according to claim 1 in which said flexible member is formed of thermoplastics material.

9. A tension line system according to claim 1 in which a plurality of tension lines are associated with a single flexible member.

* * * * *